No. 736,638. Patented August 18, 1903.

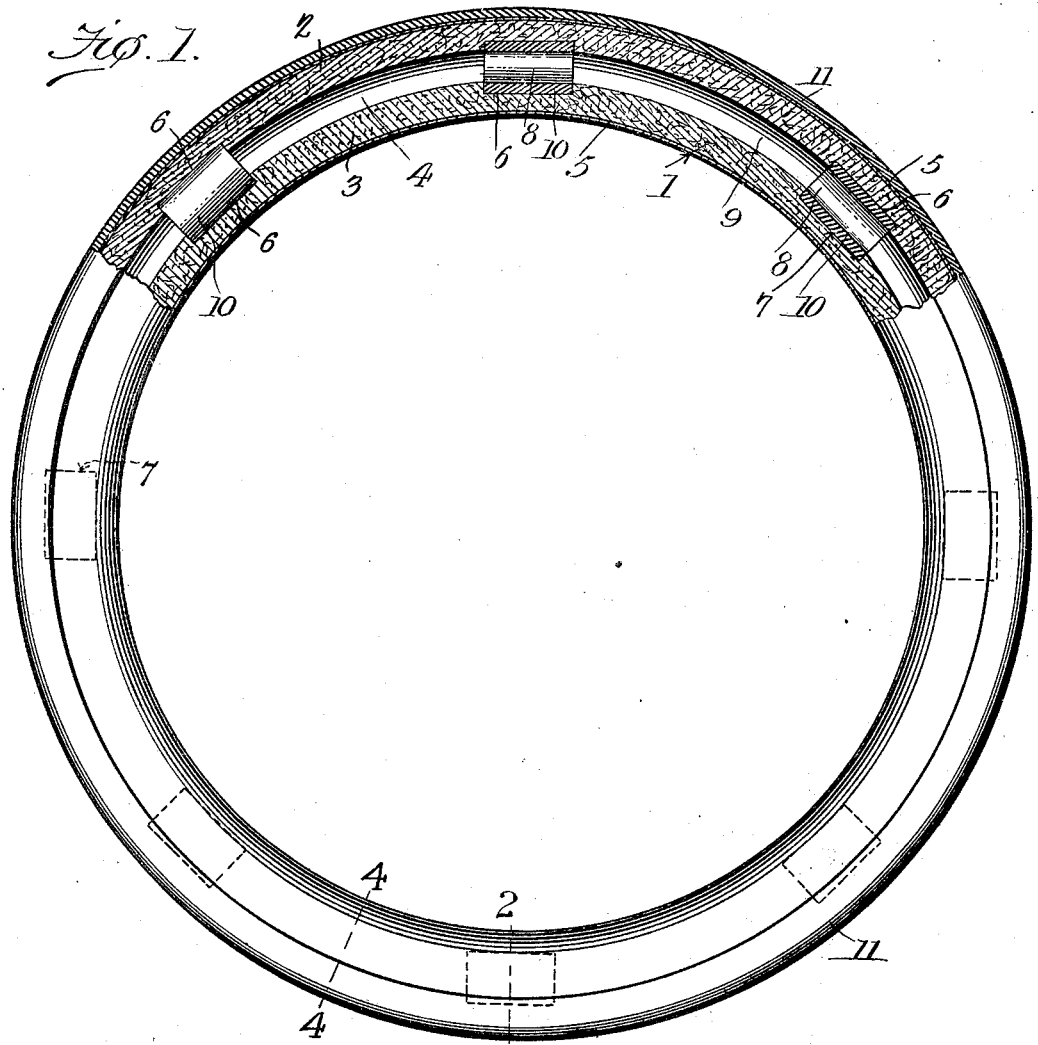
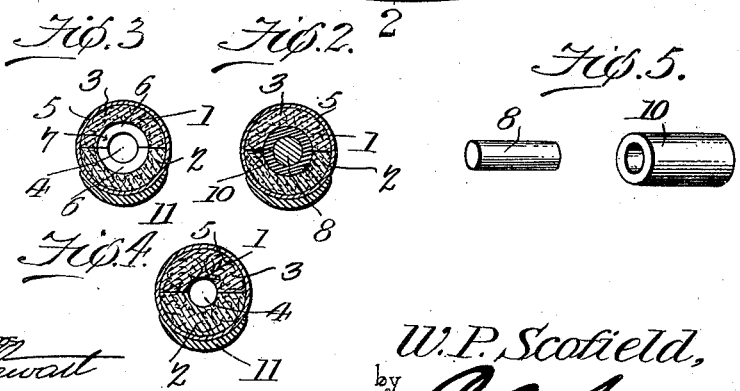

UNITED STATES PATENT OFFICE.

WALTER P. SCOFIELD, OF GAINESVILLE, FLORIDA, ASSIGNOR OF ONE-HALF TO ROBERT B. LIVINGSTON, OF GAINESVILLE, FLORIDA.

TIRE.

SPECIFICATION forming part of Letters Patent No. 736,638, dated August 18, 1903.

Application filed March 4, 1903. Serial No. 146,208. (No model.)

*To all whom it may concern:*

Be it known that I, WALTER P. SCOFIELD, a citizen of the United States, residing at Gainesville, in the county of Alachua and State of Florida, have invented a new and useful Tire, of which the following is a specification.

This invention relates to improvements in tires, and more particularly to that class known as cushion-tires adapted for use on bicycles, automobiles, and other vehicle-wheels, and has for its object to provide a simple, inexpensive, and efficient device of this character which is light and durable and possesses a greater degree of strength and resiliency than the ordinary tire.

A further object of the invention is to provide a tire the body or core of which is composed of a light elastic material, such as cork, pith, or similar material, inclosed in an outer covering of canvas, rubber, or the like, giving it the appearance of an ordinary pneumatic tire and at the same time rendering it absolutely puncture-proof.

The invention consists in the construction and novel combination of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the drawings, Figure 1 is a side elevation, partly in section, of a tire construction in accordance with my invention, showing the arrangement of the partitions or spacing-blocks. Fig. 2 is a transverse sectional view on the line 2 2 of Fig. 1. Fig. 3 is a transverse sectional view of the tire with the spacing-blocks removed, showing the construction of the pockets. Fig. 4 is a transverse sectional view on the line 4 4 of Fig. 1, and Fig. 5 is a detail perspective view of one of the spacing-blocks and sleeves detached.

Similar numerals of reference indicate corresponding parts in all the figures of the drawings.

1 designates the tire, which consists of a core or body portion formed of suitable elastic material, such as cork, pith, porous rubber, or the like, preferably granulated and mixed with waterproof glue or other suitable adhesive material and molded to form two members 2 and 3, semicircular in cross-section and defining an annular bore or channel 4, and said tire-sections are incased in an outer covering 5 of canvas, leather, rubber, or similar material. The sections 2 and 3 are each provided with coincident segmental depressions or recesses 6, arranged at intervals around the same and communicating with the annular bore or channel and forming when said sections are secured together a series of annular chambers or pockets 7, adapted to receive spacing blocks or partitions 8, which divide the bore or channel into one or more air-chambers 9 and also receive the tread-pressure of the tire, giving it the desired strength and solidity. The spacing-blocks 8, which may be formed of wood, metal, cork, or other suitable material, are preferably of a diameter equal to the diameters of the bore or channel 4, and said blocks or partitions are provided with tubular sleeves or cushions 10, formed of rubber or other suitable elastic material, which fit within the recesses 6 and prevent lateral or longitudinal displacement of said blocks, giving the desired resiliency to the tire and taking up any sudden jar or strain incident to riding.

A continuous tread or shoe 11, curved in cross-section and formed of rubber or other suitable material, is cemented, glued, or otherwise secured to the covering 5 and forms a tread-surface for the tire, holding the several sections together and preventing the core or body portion from coming in contact with the ground.

In assembling the several parts composing the tire the spacing blocks or partitions are first placed in one of the sections comprising the core or body portion with the flexible sleeves or tubes fitting within the recesses 6. The corresponding section is then placed in position and the parts secured together by gluing or otherwise affixing the outer covering of canvas, after which the endless shoe may be secured in any suitable manner to the outer covering, forming a soft resilient tread-surface for the tire.

From the foregoing description it will be seen that I have produced a vehicle-tire having the appearance of the ordinary pneumatic tire, but which is unaffected by puncture, the partition-blocks dividing the central bore or channel into a series of air-chambers, each chamber being separate and distinct from the other, said blocks also serving to properly space apart the sections composing the core, while the rubber cushions give the tire the proper resiliency, preventing jarring and jolting in riding over rough roads.

Having thus described my invention, what I claim, and desire to secure by Letters Patent, is—

1. A bicycle-tire comprising a sectional hollow core or body portion provided with a plurality of recesses or pockets, partitions or spacing-blocks arranged within the pockets and defining one or more air-chambers, said partitions or blocks each being provided with an elastic sleeve or collar.

2. A bicycle-tire comprising a sectional hollow core or body portion formed of cork or like substance, said core or body portion being provided with a plurality of recesses, or pockets, partitions or spacing-blocks arranged in said pockets, elastic sleeves or collars on said blocks or partitions, and an outer covering for the core or body portion.

3. A bicycle-tire comprising a core or body portion formed in two sections, defining an annular bore or channel and having coincident openings or recesses communicating with the bore or channel, spacing blocks or partitions provided with elastic sleeves or collars fitting within the recesses and defining a series of air-chambers, a protecting-covering for the core or body portion and an outer resilient shoe or tread-surface.

4. A bicycle-tire comprising a core or body portion made of cork and formed in two sections defining an annular bore or chamber, a covering serving to secure said sections together, a plurality of recesses or pockets formed in said sections and communicating with the bore or channel, partitions or spacing-blocks of approximately the same diameter as the bore or channel and provided with elastic sleeves or collars fitting within the recesses or pockets and a segmental shoe or tread-surface secured to the covering.

In testimony that I claim the foregoing as my own I have hereto affixed my signature in the presence of two witnesses.

WALTER P. SCOFIELD.

Witnesses:
E. WALKER,
A. P. HARDEE.